(12) United States Patent
Kinder et al.

(10) Patent No.: US 10,047,663 B2
(45) Date of Patent: Aug. 14, 2018

(54) CHARGE AIR COOLER WITH MULTI-PIECE PLASTIC HOUSING

(71) Applicant: DANA CANADA CORPORATION, Oakville (CA)

(72) Inventors: Lee M. Kinder, Oakville (CA); Kenneth M. A. Abels, Oakville (CA); Christopher Lynn Flowers, Humboldt, TN (US)

(73) Assignee: Dana Canada Corporation, Oakville, Ontario (CA)

( * ) Notice: Subject to any disclaimer, the term of this patent is extended or adjusted under 35 U.S.C. 154(b) by 162 days.

(21) Appl. No.: 15/524,492

(22) PCT Filed: Apr. 29, 2015

(86) PCT No.: PCT/CA2015/050358
§ 371 (c)(1),
(2) Date: May 4, 2017

(87) PCT Pub. No.: WO2015/164968
PCT Pub. Date: Nov. 5, 2015

(65) Prior Publication Data
US 2017/0268413 A1    Sep. 21, 2017

Related U.S. Application Data

(60) Provisional application No. 61/985,588, filed on Apr. 29, 2014.

(51) Int. Cl.
*F02B 29/04* (2006.01)
*F28D 1/06* (2006.01)
(Continued)

(52) U.S. Cl.
CPC ......... *F02B 29/0462* (2013.01); *F02M 31/20* (2013.01); *F28D 1/03* (2013.01); *F28D 1/06* (2013.01); *F28F 9/001* (2013.01)

(58) Field of Classification Search
CPC ........ F28F 3/025; F28F 9/001; F28F 2220/00; F28F 1/128; F28F 2009/004; F28F 2009/0292; F28D 2021/0082; F28D 1/03
See application file for complete search history.

(56) References Cited

U.S. PATENT DOCUMENTS 3,389,451 A    6/1968    Speca et al.
3,503,631 A    3/1970    Greever
(Continued)

FOREIGN PATENT DOCUMENTS

CN    201698241 U    1/2011
DE    102009025292 A1    1/2011
(Continued)

OTHER PUBLICATIONS

Machine-generated English Translation of DE 10 2009 025 292, obtained via Espacenet Patent Search.
(Continued)

*Primary Examiner* — Long T Tran
(74) *Attorney, Agent, or Firm* — Marshall & Melhorn, LLC

(57) ABSTRACT

A gas/liquid heat exchanger for cooling a hot gas has a plastic housing at least partly surrounding a metal core. The housing has separately formed inlet and outlet segments which may be formed from plastic materials having different heat resistance, and which are joined together along a sealed joint. One or both of the inlet and outlet segments are provided with bypass blocking element to at least partially blocks any gaps between the irregularly shaped sides of the core and the sides of the housing. Where the sides of the core include indentations, the bypass blocking elements may comprise a comb structure having fingers extending into the indentations. The housing is constructed to permit the core
(Continued)

to be slidingly received into one or both of the inlet segment and the outlet segment of the housing.

20 Claims, 11 Drawing Sheets

(51) Int. Cl.
*F28F 9/00* (2006.01)
*F02M 31/20* (2006.01)
*F28D 1/03* (2006.01)

(56) References Cited

U.S. PATENT DOCUMENTS

| | | | |
|---|---|---|---|
| 3,768,148 | A | 10/1973 | Pagnotta et al. |
| 4,219,079 | A | 8/1980 | Sumitomo |
| 4,436,145 | A | 3/1984 | Manfredo et al. |
| 4,474,162 | A | 10/1984 | Mason |
| 4,870,671 | A | 9/1989 | Hershyn |
| 5,186,248 | A * | 2/1993 | Halstead ............ B60H 1/3227 165/153 |
| 5,297,624 | A | 3/1994 | Haussmann et al. |
| 5,354,394 | A * | 10/1994 | Seebo .................. B29C 33/52 156/155 |
| 5,441,706 | A * | 8/1995 | Whittenberger ..... B01J 35/0033 422/174 |
| 5,617,992 | A | 4/1997 | Huddleston et al. |
| RE35,890 | E | 9/1998 | So |
| 5,816,316 | A | 10/1998 | Hoffnung |
| 6,079,481 | A | 6/2000 | Lawenstein et al. |
| 6,182,746 | B1 | 2/2001 | Wiese |
| 6,273,183 | B1 | 8/2001 | So et al. |
| 7,395,853 | B2 | 7/2008 | Kroetsch et al. |
| 7,562,444 | B2 | 7/2009 | Vetter |
| 7,628,883 | B2 | 12/2009 | Daly et al. |
| 7,707,997 | B2 | 5/2010 | Yoon |
| 7,921,905 | B2 | 4/2011 | Baylis et al. |
| 8,286,615 | B2 | 10/2012 | Dehnen et al. |
| 8,813,729 | B2 | 8/2014 | Diem et al. |
| 9,616,730 | B2 | 4/2017 | Humburg |
| 2006/0278377 | A1 | 12/2006 | Martins et al. |
| 2007/0012423 | A1 | 1/2007 | Kinoshita et al. |
| 2007/0119564 | A1 * | 5/2007 | Contet .................. F28D 1/0435 165/67 |
| 2007/0251683 | A1 | 11/2007 | Desai et al. |
| 2008/0093061 | A1 | 4/2008 | Desai et al. |
| 2010/0032149 | A1 | 2/2010 | Roll et al. |
| 2011/0017436 | A1 | 1/2011 | Cho |
| 2012/0090820 | A1 | 4/2012 | Feichtinger et al. |
| 2013/0133869 | A1 | 5/2013 | Kinder et al. |
| 2014/0090827 | A1 | 4/2014 | Iguchi et al. |
| 2014/0130764 | A1 | 5/2014 | Saumweber et al. |
| 2014/0151011 | A1 | 6/2014 | Kim et al. |
| 2014/0216385 | A1 | 8/2014 | Bruggesser et al. |
| 2014/0246186 | A1 | 9/2014 | Bruggesser et al. |
| 2014/0299295 | A1 | 10/2014 | Kalbacher et al. |
| 2014/0311142 | A1 | 10/2014 | Speidel et al. |
| 2014/0311143 | A1 | 10/2014 | Speidel et al. |
| 2014/0318751 | A1 * | 10/2014 | Kinder ................ F28D 1/05366 165/151 |
| 2015/0323266 | A1 * | 11/2015 | Bardeleben ............ F28F 3/025 165/76 |
| 2016/0097596 | A1 * | 4/2016 | Stewart ................ F28D 1/0233 165/175 |

FOREIGN PATENT DOCUMENTS

| | | |
|---|---|---|
| JP | H08100719 A | 4/1996 |
| WO | 96/14882 A1 | 5/1996 |
| WO | 2005/001272 A1 | 1/2005 |
| WO | 2009027492 A1 | 3/2009 |

OTHER PUBLICATIONS

Machine-generated English Translation of WO 2009/027492, obtained via Espacenet Patent Search.

Canadian Intellectual Property Office, International Search Report with Written Opinion, issued in International Application No. PCT/CA2015/050358, dated Jul. 7, 2015, 10 pages, Candian Intellectual Property Office, Gatineau, Quebec, Canada.

* cited by examiner

CHARGE AIR COOLER WITH MULTI-PIECE PLASTIC HOUSING

CROSS-REFERENCE TO RELATED APPLICATION

This application claims priority to and the benefit of U.S. Provisional Patent Application No. 61/985,588 filed Apr. 29, 2014, the contents of which are incorporated herein by reference.

FIELD OF THE INVENTION

The invention generally relates to heat exchangers for cooling a hot gas with a liquid coolant, and particularly to gas-liquid charge air coolers having a plastic housing enclosing an aluminum heat exchanger core.

BACKGROUND OF THE INVENTION

It is known to use gas-liquid heat exchangers to cool compressed charge air in turbocharged internal combustion engines or in fuel cell engines, or to cool hot engine exhaust gases. For example, compressed charge air is typically produced by compressing ambient air. During compression, the air can be heated to a temperature of about 200° C. or higher, and must be cooled before it reaches the engine.

Various constructions of gas-cooling heat exchangers are known. For example, gas-cooling heat exchangers commonly have an aluminum core comprised of a stack of tubes or plate pairs, with each tube or plate pair defining an internal coolant passage. The tubes or plate pairs are spaced apart to define gas flow passages which are typically provided with turbulence-enhancing inserts to improve heat transfer from the hot gas to the liquid coolant.

In some gas-liquid charge air coolers, the core is "self-enclosing", meaning that the sides of the gas flow passages are enclosed by the sides of the aluminum core. The gas inlet and outlet openings are typically provided at the open ends of the gas flow passages. Tanks are provided over the ends of the core to enclose the open ends of the core, to provide inlet and outlet openings, and to provide manifold spaces for the gas flow. However, it may be difficult to achieve a reliable crimp seal, particularly where the tanks and core are made of dissimilar materials. In addition, the tubes or plate pairs include flanges or other structures to enclose the sides of the core, increasing the material cost of the core.

There remains a need for gas-cooling heat exchangers which provide high reliability while avoiding excessive material and/or manufacturing costs.

SUMMARY OF THE INVENTION

In one aspect, there is provided a gas/liquid heat exchanger comprising: (a) a core having a top, a bottom, a pair of sides, an inlet end, an outlet end, coolant inlet and outlet openings, and gas inlet and outlet openings, wherein the gas inlet and outlet openings are provided at the respective inlet and outlet ends of the core; (b) a housing at least partially surrounding the core, wherein the housing comprises an inlet end portion over the inlet end of the core, and an outlet end portion over the outlet end of the core; wherein the inlet end portion of the housing includes a gas inlet opening in communication with the gas inlet opening of the core, and the outlet end portion of the housing includes a gas outlet opening in communication with the gas outlet opening of the core; and wherein the housing comprises an inlet segment which includes the inlet end portion of the housing and an outlet segment which includes the outlet end portion of the housing, wherein the inlet and outlet segments are separately formed.

In an embodiment, the housing surrounds the core, wherein the housing comprises a top cover over the top of the core, a bottom cover over the bottom of the core, and a pair of side covers over the sides of the core. In an embodiment, the housing includes a coolant inlet opening communicating with the coolant inlet opening of the core, and a coolant outlet opening communicating with the coolant outlet opening of the core.

In an embodiment, the inlet and outlet segments are each joined to a remainder of the housing along a sealed joint. In an embodiment, the inlet segment of the housing is directly joined to the outlet segment along said sealed joint. In an embodiment, a portion of the sealed joint lies in a plane which extends through both of the side covers of the housing. In an embodiment, portions of the sealed joint extend across the top cover and the bottom cover of the housing.

In an embodiment, a portion of the sealed joint lies in a plane which extends through both of the side covers of the housing and wherein said plane is substantially perpendicular to the top cover and/or the bottom cover of the housing. In an embodiment, a portion of the sealed joint extends across the top cover of the housing between the coolant inlet and outlet openings of the housing, such that one of the coolant inlet and outlet openings is provided in the inlet segment of the housing, and the other of the coolant inlet and outlet openings is provided in the outlet segment of the housing.

In an embodiment, a portion of the sealed joint lies in a plane which extends through both of the side covers of the housing and wherein said plane is inclined relative to the top cover and/or the bottom cover of the housing. In an embodiment, a portion of the sealed joint extends across the top cover of the housing proximate to the outlet end portion of the housing, and wherein the coolant inlet and outlet openings of the housing are both provided in the inlet segment of the housing.

In an embodiment, the inlet and outlet segments of the housing are each comprised of a plastic material, and wherein the core is comprised of aluminum. In an embodiment, the plastic material comprising the inlet segment has a heat resistance which is greater than a heat resistance of the plastic material comprising the outlet segment.

In an embodiment, the inlet and outlet segments of the housing are each comprised of a plastic material, wherein the coolant inlet opening of the housing is provided with a plastic inlet fitting and the coolant outlet opening of the housing is provided with a plastic outlet fitting, wherein the coolant inlet opening of the core is provided with an aluminum inlet fitting and the coolant outlet opening of the core is provided with an aluminum outlet fitting, and wherein the coolant inlet fitting of the core is sealingly received in the coolant inlet opening of the housing and the coolant outlet fitting of the core is sealingly received in the coolant outlet opening of the housing.

In an embodiment, the core comprises a stack of flat tubes, each of the tubes having a hollow interior defining a coolant flow passage, wherein the tubes are spaced apart to define gas flow passages between the tubes. In an embodiment, the top of the core is defined by a top plate of the core, and wherein the inlet and outlet openings of the core are both provided in the top plate.

In an embodiment, turbulence-enhancing inserts are provided in the gas flow passages.

In an embodiment, at least one of the side covers of the housing is spaced from one of the sides of the core by a gap, and wherein the heat exchanger further comprises at least one bypass blocking element, wherein each of said blocking elements at least partially blocks one of the gaps. In an embodiment, each of said bypass blocking elements extends along one of the sides of the core, and extends from the top to the bottom of the core, so as to substantially completely block one of said gaps.

In an embodiment, both of the bypass blocking elements are attached to only one of the segments of the housing. In an embodiment, both of the bypass blocking elements are attached to the outlet segment of the housing.

In an embodiment, the bypass blocking elements are provided in both the inlet and outlet segments of the housing. In an embodiment, the bypass blocking elements extend along substantially an entire length of the core from the inlet end to the outlet end.

In an embodiment, the sides of the core include indentations, and wherein the bypass blocking elements each comprise a comb structure having fingers extending into the indentations.

In an embodiment, the sealed joint is located in a substantially vertical plane extending from the bottom cover to the top cover, dividing each of the top cover, the bottom cover and the side covers into two portions. In an embodiment, the sealed joint is formed by a pair of nesting, axial flanges, a first one of the flanges extending axially from an end of inlet segment, and a second flange extending axially from an end of the outlet segment. In an embodiment, the axial flanges are shaped and sized such that the one of the flanges fits inside and nests with the other of the flanges.

In an embodiment, the inlet and outlet segments of the housing are both cup-shaped with open ends, and wherein the sealed joint is located in a plane which is between the coolant inlet and outlet openings, such that the coolant and outlet openings are located on opposite sides of the sealed joint. In an embodiment, the sealed joint is provided in a substantially vertical plane.

In an embodiment, the coolant inlet and outlet openings and the coolant inlet and outlet fittings are provided in a fitting portion of the housing, wherein the fitting portion is separately formed from the inlet segment and the outlet segment. In an embodiment, the fitting portion comprises a cover portion having a first end at which the coolant inlet opening is provided and at which the inlet fitting is mounted on an upper surface thereof, and a second end at which the coolant outlet opening is provided and at which the outlet fitting is mounted on an upper surface thereof.

In an embodiment, the top cover of the housing has an elongate slotted opening, and wherein the cover portion of the fitting portion shaped and sized to cover the slotted opening. In an embodiment, the slotted opening extends across the sealed joint and includes a first portion in the inlet segment and a second portion in the outlet segment, wherein the first and second portions of the slotted opening are open at the open ends of the inlet and outlet segments.

In an embodiment, the coolant inlet opening of the core is provided with an aluminum inlet fitting and the coolant outlet opening of the core is provided with an aluminum outlet fitting, and wherein the coolant inlet fitting of the core is received in the coolant inlet opening of the fitting portion of the housing and the coolant outlet fitting of the core is received in the coolant outlet opening of the fitting portion of the housing. In an embodiment, the cover portion of the fitting portion has a lower surface from which cylindrical collars extend downwardly, wherein the cylindrical collars are adapted to fit over and seal with the inlet and outlet fittings of the core.

In an embodiment, the cover portion has a downwardly extending peripheral flange and the housing has an upstanding peripheral flange substantially surrounding the slotted opening in the top cover of the housing; and wherein the downwardly extending peripheral flange of the cover portion is adapted to fit over and nest with the upstanding peripheral flange of the housing.

In an embodiment, the core is slidably received in both the inlet and outlet segments of the housing.

BRIEF DESCRIPTION OF THE DRAWINGS

The invention will now be described, by way of example only, with reference to the accompanying drawings, in which.

DETAILED DESCRIPTION

Figure 1:
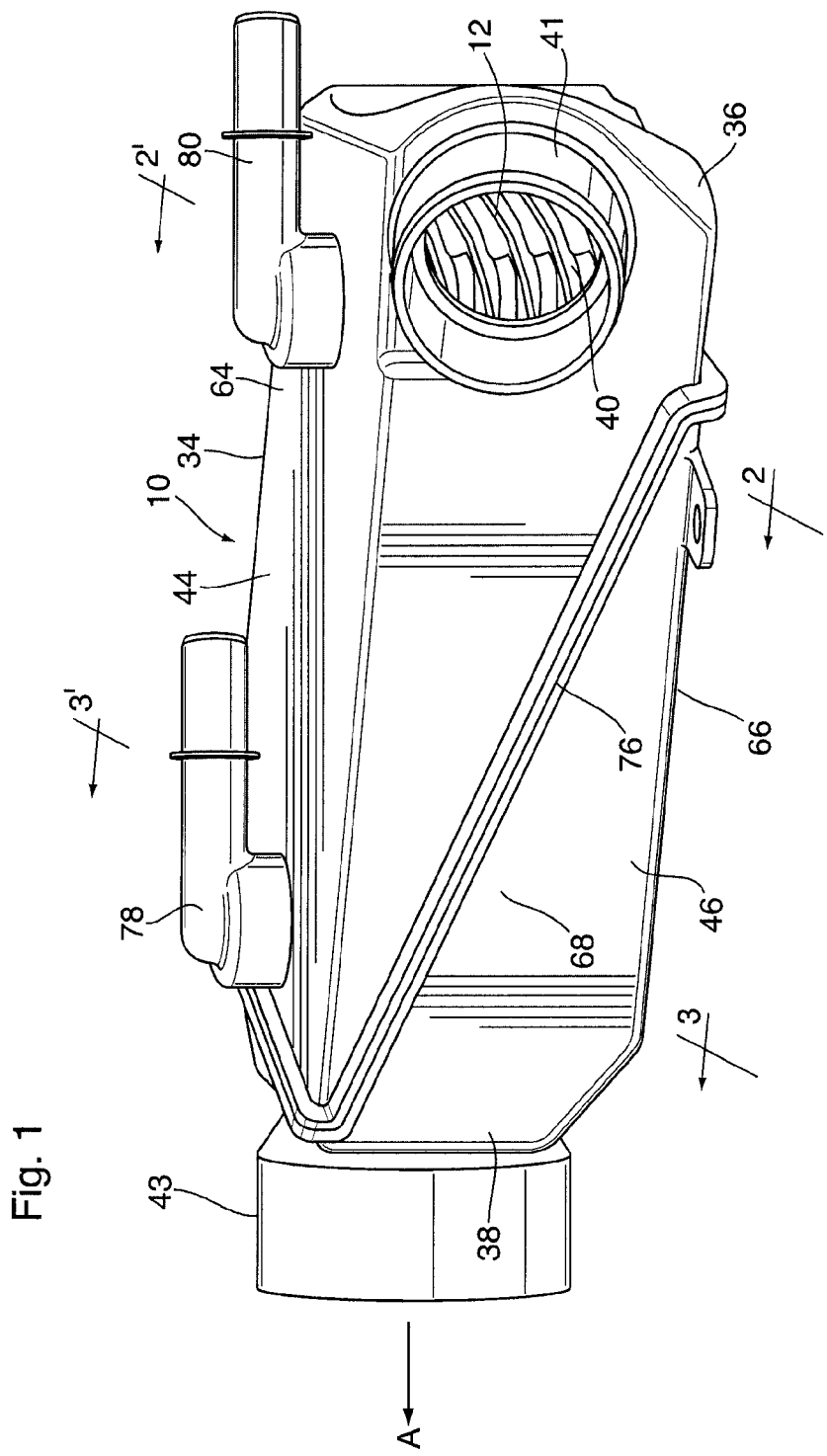
FIG. 1 is a perspective view of a gas/liquid heat exchanger according to a first embodiment.

A heat exchanger 10 according to a first embodiment is now described below with reference to FIGS. 1 to 9.

Heat exchanger 10 is a charge air cooler for a motor vehicle powered by an engine requiring compressed charge air, such as a turbocharged internal combustion engine or a fuel cell engine. The heat exchanger 10 will be mounted downstream of an air compressor and upstream of an air intake manifold of the engine to cool the hot, compressed charge air before it reaches the engine. In the following description, the coolant circulated through the heat exchanger 10 is a liquid coolant which may be the same as the engine coolant, and which may comprise water or a water/glycol mixture.

It will be appreciated that the specific arrangement and locations of the inlet and outlet openings for air and coolant will at least partially depend on the specific configuration of a vehicle's air intake system, and will vary from one application to another.

Heat exchanger 10 comprises a core 12 having a top 14, a bottom 16, a pair of sides 18, 20, an inlet end 22, an outlet end 24, coolant inlet and outlet openings 26, 28, and gas inlet and outlet openings 30, 32. The gas inlet and outlet openings 30, 32 are provided at the respective inlet and outlet ends 22, 24 of the core 12. The core 12 of heat exchanger 10 will typically be comprised of a metal such as aluminum or an aluminum alloy, with the components of core 12 being joined together by brazing. As used herein, the term "aluminum" is intended to include aluminum and its alloys.

The structure of the core 12 is variable, and the specific construction described herein and shown in the drawings is only one example of a possible core construction. The structure of core 12 is best seen in the cross-sectional views of FIGS. 2 to 4. Core 12 comprises a stack of flat tubes 48, each of the tubes 48 having a hollow interior defining a coolant flow passage 50. The tubes 48 may be of various constructions, and in the first embodiment are comprised of pairs of plates joined together in face-to-face relationship, and sealingly joined together by brazing along their peripheral flanges.

The tubes 48 are spaced apart from one another, with gas flow passages 52 being defined between adjacent tubes 48. The gas flow passages 52 extend from the inlet end 22 to the outlet end 24 of core 12, and the direction of gas flow through the core 12 is illustrated by arrow A in FIGS. 1 and 4.

The gas flow passages 52 extending through core 12 may be provided with turbulence-enhancing inserts 62 such as corrugated fins or turbulizers in order to provide increased turbulence and surface area for heat transfer, and to provide structural support for the core 12. The corrugated fins and turbulizers are only schematically shown in the drawings.

As used herein, the terms "fin" and "turbulizer" are intended to refer to corrugated turbulence-enhancing inserts having a plurality of axially-extending ridges or crests connected by side walls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and example of such turbulizers are described in U.S. Pat. No. Re. 35,890 (So) and U.S. Pat. No. 6,273,183 (So et al.). The patents to So and So et al. are incorporated herein by reference in their entireties.

The coolant flow passages 50 of core 12 are connected by a pair of coolant manifolds, namely a coolant inlet manifold 54 and a coolant outlet manifold 56. In the first embodiment, the manifolds 54, 56 are formed by providing apertured, upstanding bosses or bubbles in each of the plates making up the tubes 48, with the bosses of adjacent plate pairs being joined to form continuous manifolds 54, 56. The manifolds 54, 56 are in communication with each of the coolant flow passages 50 and extend throughout the height of the core 12, from the top 14 to the bottom 16. The lower ends of manifolds 54, 56 are closed by a bottom plate 58 which defines the bottom 16 of core 12, while the top 14 of core 12 is defined by a top plate 60 in which the coolant inlet 26 and coolant outlet openings 28 are defined.

In the first embodiment, the inlet and outlet manifolds 54, 56 are spaced apart along the direction of gas flow A, with the inlet manifold 54 being located proximate to the outlet end 24 of core 12, and the outlet manifold 56 being located proximate to the inlet end 22 of core 12. Therefore, in the first embodiment, the air and coolant are in counter-flow, with the coolant flowing in a direction opposite to the gas flow direction A. Alternatively, the locations of the inlet and outlet manifolds 54, 56 may be reversed such that the air and coolant are in parallel flow, with the coolant flowing in a direction parallel to the gas flow direction A. In yet other embodiments, the manifolds 54, 56 may both be located adjacent to the same end 22 or 24 of core 12, with the coolant flow passages 50 being U-shaped.

Heat exchanger 10 further comprises a housing 34 at least partially surrounding the core 12. The housing 34 comprises at least an inlet end portion 36 provided over the inlet end 22 of the core 12, and an outlet end portion 38 provided over the outlet end 24 of core 12. The inlet end portion 36 includes a gas inlet opening 40 communicating with the gas inlet opening 30 of core 12, and also includes a gas inlet fitting 41 for direct or indirect connection to an upstream component of a vehicle engine system, such as an air compressor (not shown). The outlet end portion 38 includes a gas outlet opening 42 communicating with the gas outlet opening 32 of the core 12, and also includes a gas outlet fitting 43 for direct or indirect connection to a downstream component of a vehicle engine system, such as an intake manifold (not shown).

The inlet and outlet end portions 36, 38 are provided in distinct, separately formed segments of the housing 34. In this regard, the housing 34 is formed from a plurality of segments, including an inlet segment 44 which includes the inlet end portion 36 and an outlet segment 46 which includes the outlet end portion 38 of the housing 34.

As will be appreciated, during use of heat exchanger 10, the inlet end portion 36 of housing 34 will be in direct contact with hot charge air which has not been passed through the core 12 of heat exchanger 10, while the outlet end portion 38 of housing 34 will be in direct contact with cooled charge air which has transferred heat to the coolant by being passed through the gas flow passages 52 of core 12. The temperature difference between the hot and cool charge air can be significant, with the charge air inlet temperature being from about 150-200 degrees Celsius and the charge air outlet temperature being from about 50-100 degrees Celsius.

The provision of the inlet and outlet end portions 36, 38 in separate segments 44, 46 of housing 34 permits the portions of housing 34 which are in direct contact with hot charge air to be made from a material with higher heat resistance than the portions of the housing 34 which are in direct contact with the cooled charge air. In the first embodiment, the material comprising the inlet segment 44 has a heat resistance which is greater than the heat resistance of the material comprising the outlet segment 46. For example, the heat resistance of the material comprising the inlet segment 44 is sufficient to withstand continuous operating temperatures which are greater than the maximum temperature of the charge air entering the inlet end portion 36 of housing 34. On the other hand, the heat resistance of the material comprising the outlet segment 46 is sufficient to withstand continuous operating temperatures which are greater than the maximum temperature of the charge air entering the outlet end portion 38 of housing 34.

Since materials having greater heat resistance are generally more expensive than materials having lower heat resistance, the separation of housing 34 into a high temperature resistant inlet segment 44 and a lower temperature resistant outlet segment 46 may provide cost benefits over a housing which is entirely constructed of a material having sufficient heat resistant to withstand continuous exposure to hot charge air.

In some embodiments of the invention, the housing 34 will be comprised of plastic, with the inlet segment 44 being comprised of one or more plastic materials having high heat resistance as described above, and with the outlet segment 46 being comprised of one or more plastic materials having lower heat resistance, as described above.

In the first embodiment, the housing 34 is continuous and substantially completely surrounds the core 12. In addition to the inlet end portion 36 and the outlet end portion 38, the housing 34 also comprises a top cover 64 which is provided over the top 14 of core 12, a bottom cover 66 which is provided over the bottom 16 of core 12, and a pair of side covers 68, 70 which are provided over the sides 18, 20 of core 12. The end portions 36, 38 and the covers 64, 66, 68, 70 of housing 34 are joined together so as to form a continuous enclosure about the core 12, except at the gas inlet and outlet openings 40, 42.

In an alternate embodiment the housing 34 may be discontinuous, with end inlet and outlet segments 44, 46 each comprising an end cap or tank which fits over an end 22 or 24 of the core 12. In such a construction, the segments 44, 46 may be attached directly to the top 14, bottom 16 and sides 18, 20 of core 12, for example by crimping or other fastening means. In this type of construction, the core 12 is necessarily self-enclosed, having closed sides 18, 20.

In the continuous housing 12 of the first embodiment, the inlet and outlet segments 44, 46 of housing 34 are directly joined together along a sealed joint 76. A portion of the sealed joint 76 may extend through one or both of the side covers 68, 70 of housing 34. In the first embodiment, the sealed joint 76 divides each of the side covers 68, 70 into two portions, one portion belonging to the inlet segment 44 and the other portion belonging to the outlet segment 46. Although not essential, a portion of the sealed joint 76 may be located in a diagonal plane extending from the bottom cover 66 to the top cover 64. Furthermore, the diagonal portions of sealed joint 76 may extend from one end of the housing 34 to the other, starting at the bottom cover 66 proximate to the inlet end portion 36 and ending at the top cover 64 proximate to the outlet end portion 38. In addition, the sealed joint 76 includes a portion which extends transversely across the top cover 64 of housing 34 proximate to the outlet end portion 38, and a portion which extends transversely across the bottom cover 66 of the housing 34, proximate to the inlet end portion 36.

Figure 7:
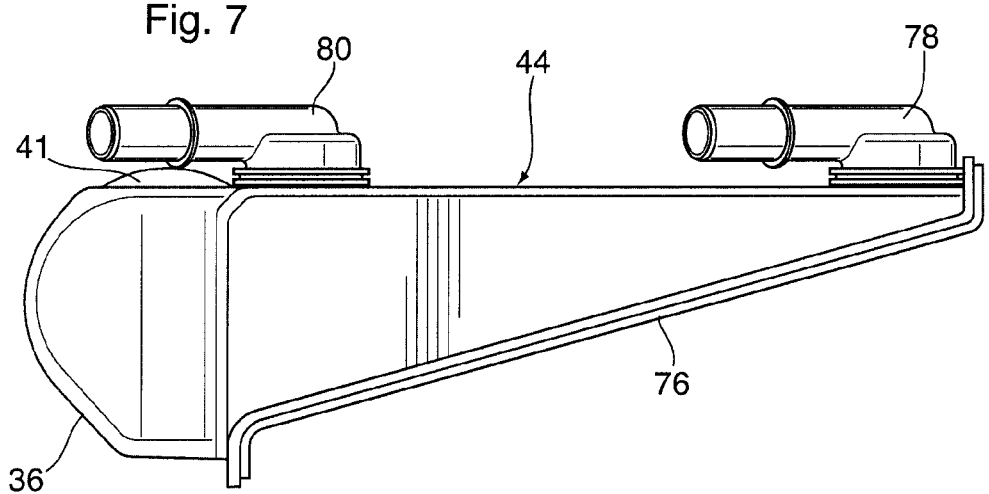
FIG. 7 is a side elevation view of the inlet segment of the housing of the heat exchanger of FIG. 1.
Figure 8:
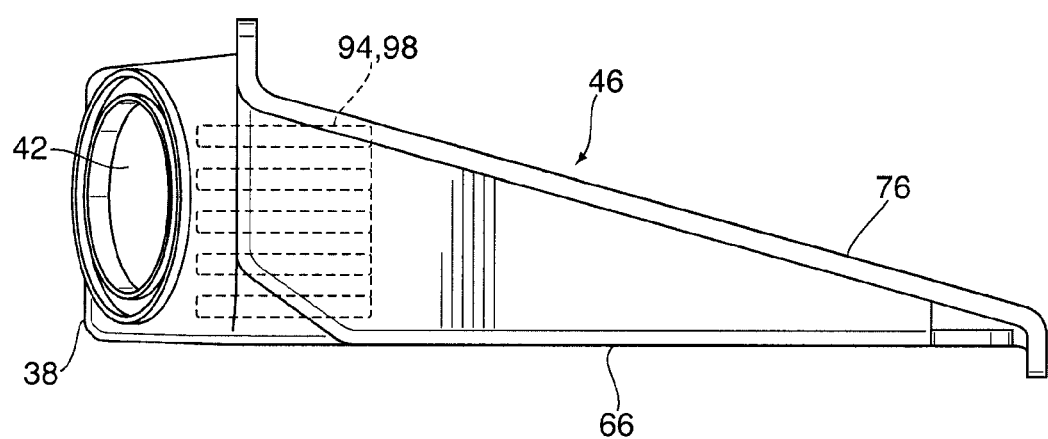
FIG. 8 is a side view of the outlet segment of the housing of the heat exchanger of FIG. 1.
Figure 9:
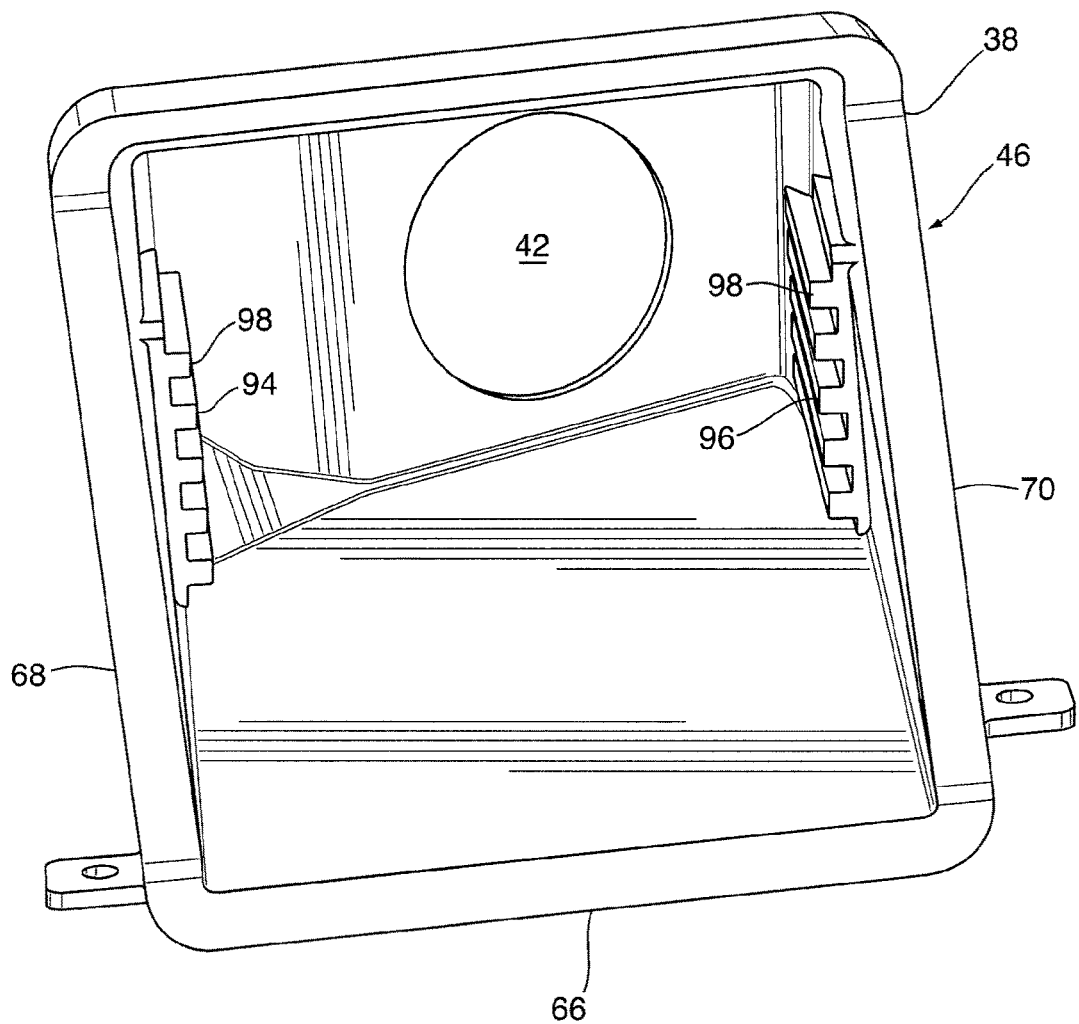
FIG. 9 is a perspective view showing the interior of the outlet segment.

In the first embodiment, as shown in FIGS. 7 and 8, the joint 76 is formed by a pair of flanges 77 protruding outwardly from the outer surfaces of housing 34 and extending continuously along the entire perimeter of the joint 76, one flange 77 being provided on inlet segment 44 and another flange 77 being provided on outlet segment 46. In addition, the mating flanges 77 may be provided with an interlocking arrangement (shown only in FIG. 5) in which a protruding ridge 79 of one segment 44 or 46 is received in a groove 81 of another segment 44 or 46.

With the housing 34 constructed from segments 44, 46 as described above, the housing 34 is effectively divided into two wedge-shaped segments. This construction is advantageous from a manufacturing standpoint, since it permits the pre-assembled core 12 to first be attached to one of the segments 44 or 46, and then permits the other segment 44 or 46 of housing 34 to be added to the assembly and secured to the other segment 44 or 46 along the sealed joint 76. The advantages of this construction will be further discussed below.

As discussed above, the coolant inlet and outlet manifolds 54, 56 are spaced apart in the gas flow direction A, and are both closed by the bottom plate 58. Consequently, the coolant inlet opening 26 and coolant outlet opening 28 are both provided in the top 14 of core 12, and more specifically in the top plate 60, so as to provide communication with the manifolds 54, 56. Similarly, both the coolant inlet opening 72 and the coolant outlet opening 74 of the housing 34 are provided in the top cover 64 thereof, and are in communication with the coolant inlet and outlet openings 26, 28 of the core 12. The housing 34 further comprises a pair of coolant inlet and outlet fittings 78, 80 communicating with the respective coolant inlet and outlet openings 72, 74, and adapted for connection to coolant conduits (not shown) in a coolant circulation system (not shown).

Where the housing 34 is made of plastic and the core 12 comprises a brazed assembly comprised of aluminum, the heat exchanger 10 includes means for forming a sealed connection between the coolant inlet and outlet openings 26, 28 of core 12 and the coolant inlet and outlet openings 72, 74 of the housing 34, and/or the inlet and outlet fittings 78, 80. For this purpose the core 12 further comprises coolant inlet and outlet fittings 82, 84 which are formed of aluminum and brazed to the remainder of core 12. In the first embodiment, the coolant inlet and outlet fittings 82, 84 are in the form of cylindrical nipples which are sealingly received inside upstanding cylindrical collars 86, 88 surrounding the coolant inlet and outlet openings 72, 74 of the housing 34. The collars 86, 88 are integrated with the housing 34. The inlet and outlet fittings 82, 84 are sealed inside the collars 86, 88 by an O-ring 85 received in an annular groove in the outer surfaces of the fittings 82, 84.

In the first embodiment, the coolant fittings 78, 80 each have a cylindrical base portion which fits over the upstanding collar 86 or 88 of one of the inlet or outlet opening 72 or 74, and sealed thereto.

During manufacture of heat exchanger 10, the brazed assembly of core 12 is secured to the inlet segment 44 of housing 34 by inserting the coolant fittings 82, 84 of core 12 into the collars 86, 88 surrounding the coolant inlet and outlet openings 72, 74 of the housing 34. To permit the formation of this sub-assembly, the bottom of the inlet segment 44 is substantially open, and therefore substantially the entire bottom cover 66 of housing 34 is provided in the outlet segment 46 of housing 34.

The turbulence-enhancing inserts 62 provide the core 12 with a certain amount of resistance to gas flow, and therefore the hot charge air will tend to bypass the heat exchanger core 12 and flow through any gaps between the housing 34 and the core 12 which permit free flow between the gas inlet opening 40 and the gas outlet opening 42 of housing 34.

Figure 2:
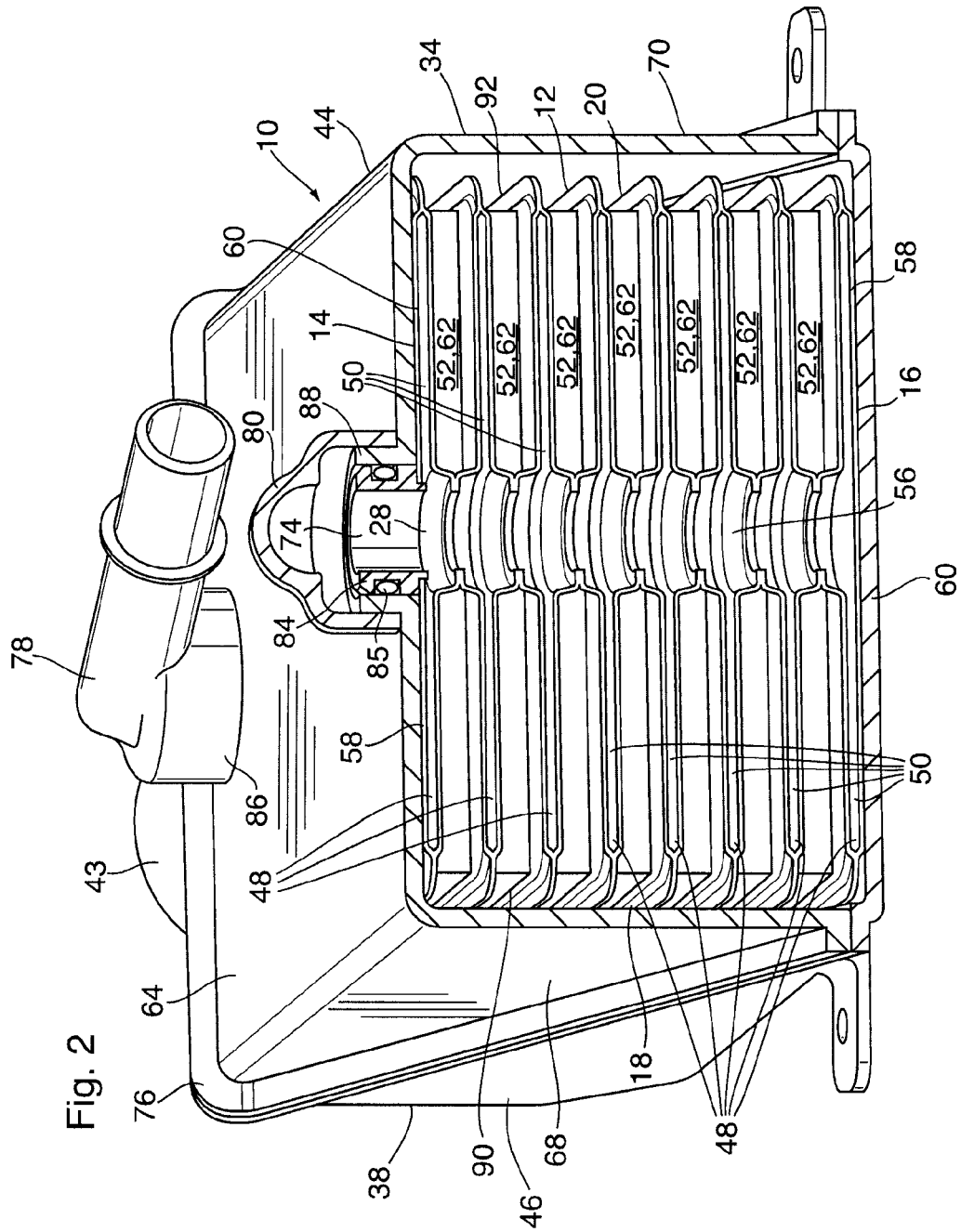
FIG. 2 is a transverse cross-section along line 2-2' of FIG. 1.
Figure 3:
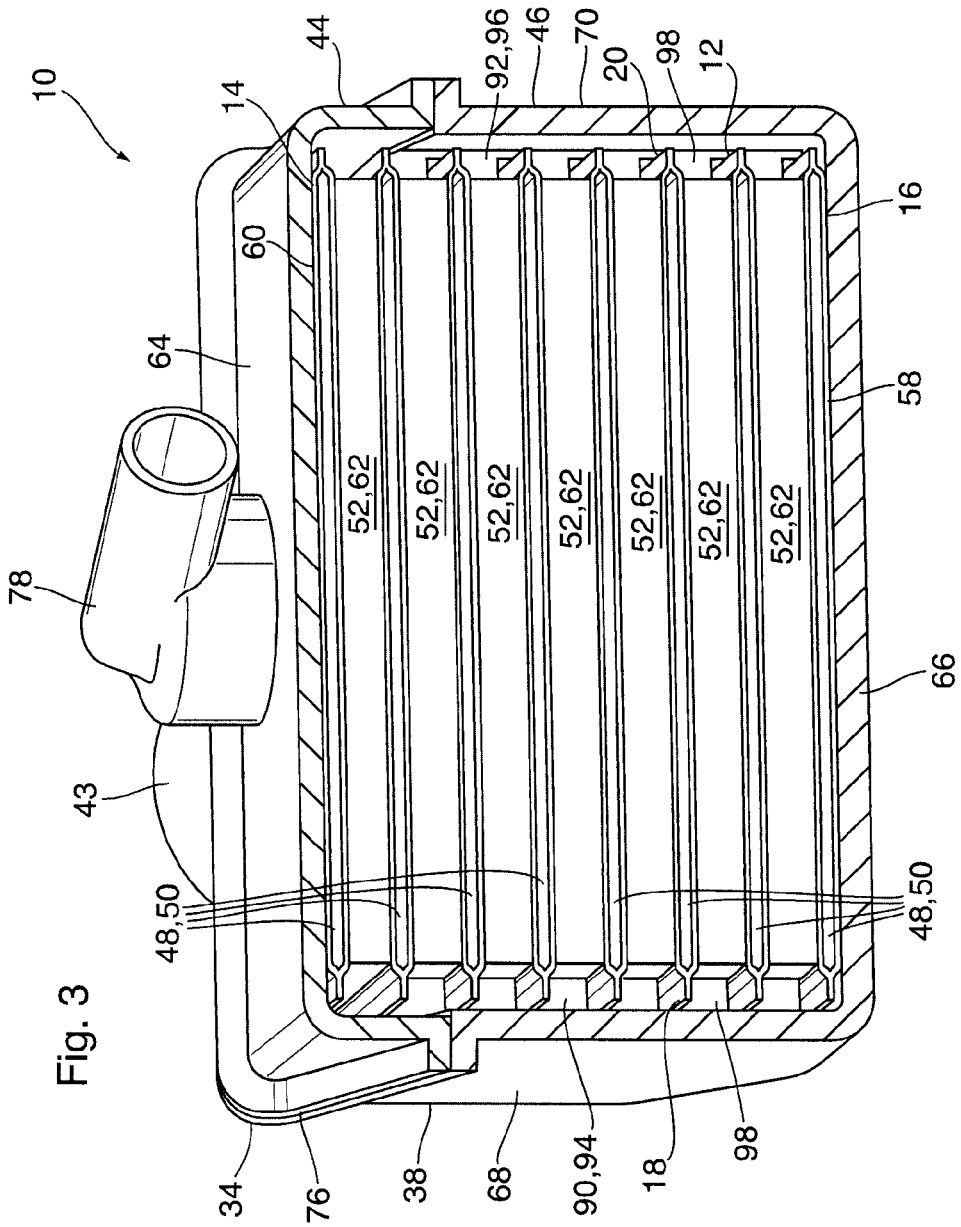
FIG. 3 is a transverse cross-section along line 3-3' of FIG. 1.
Figure 4:
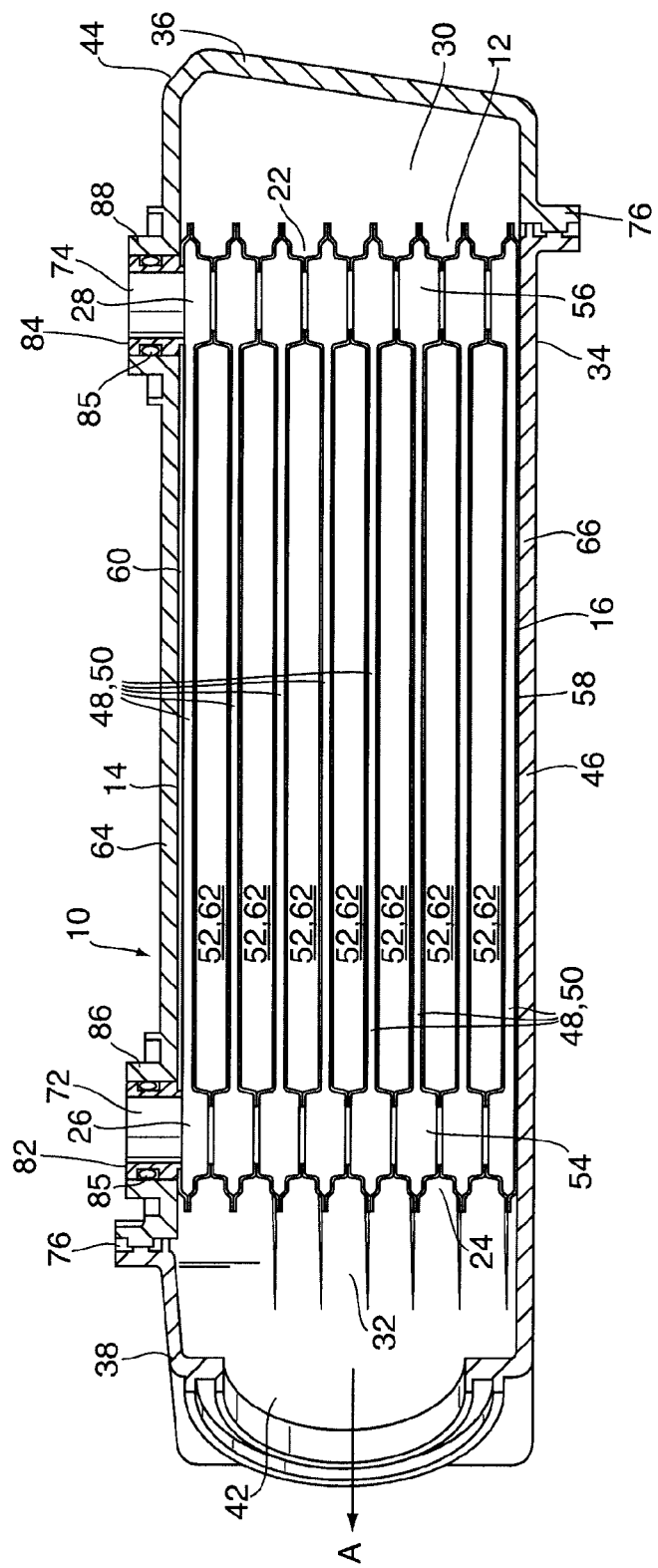
FIG. 4 is a longitudinal cross-section through the heat exchanger of FIG. 1.
Figure 5:
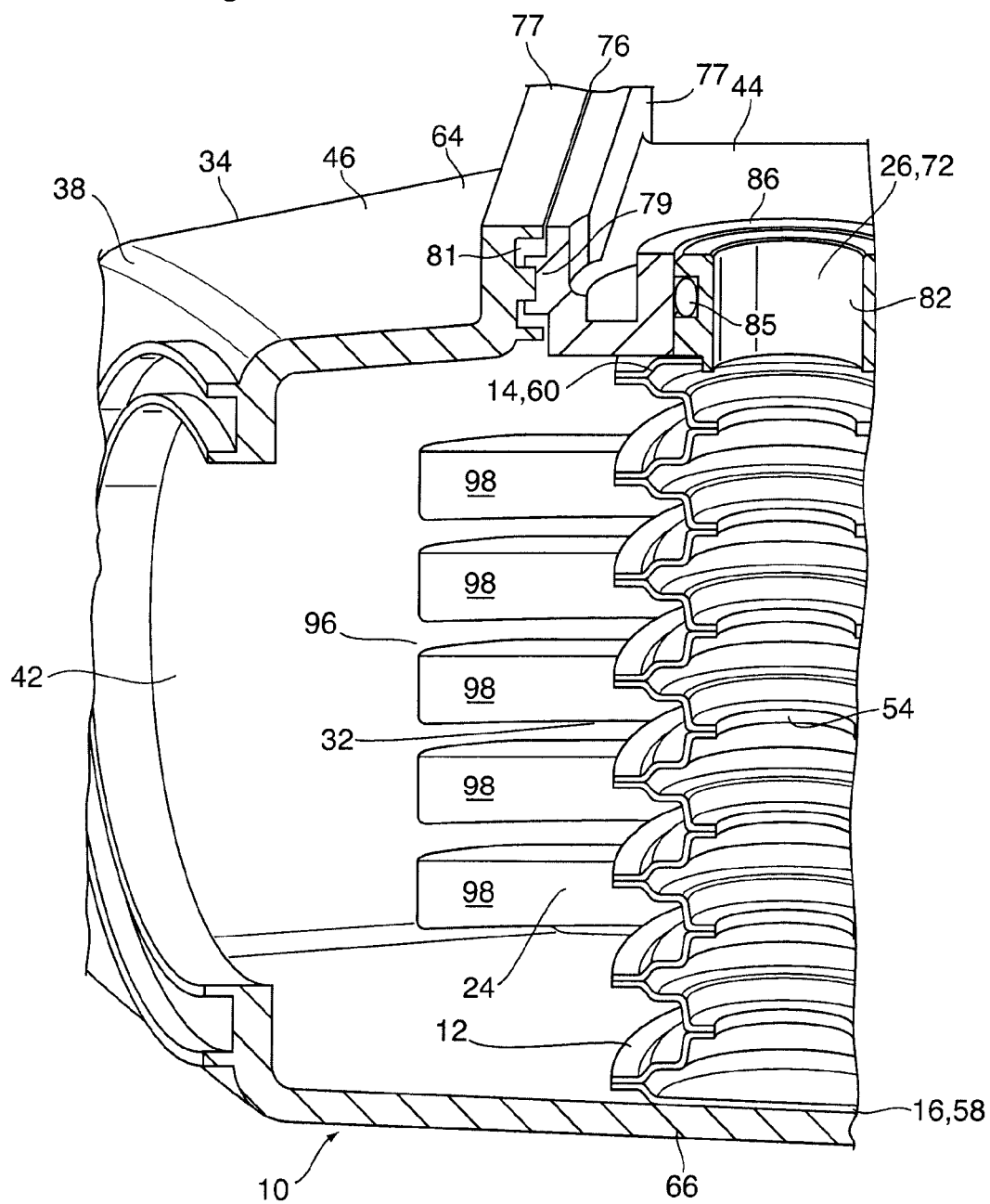
FIG. 5 is a partial close-up of the cross-section of FIG. 4.
Figure 6:
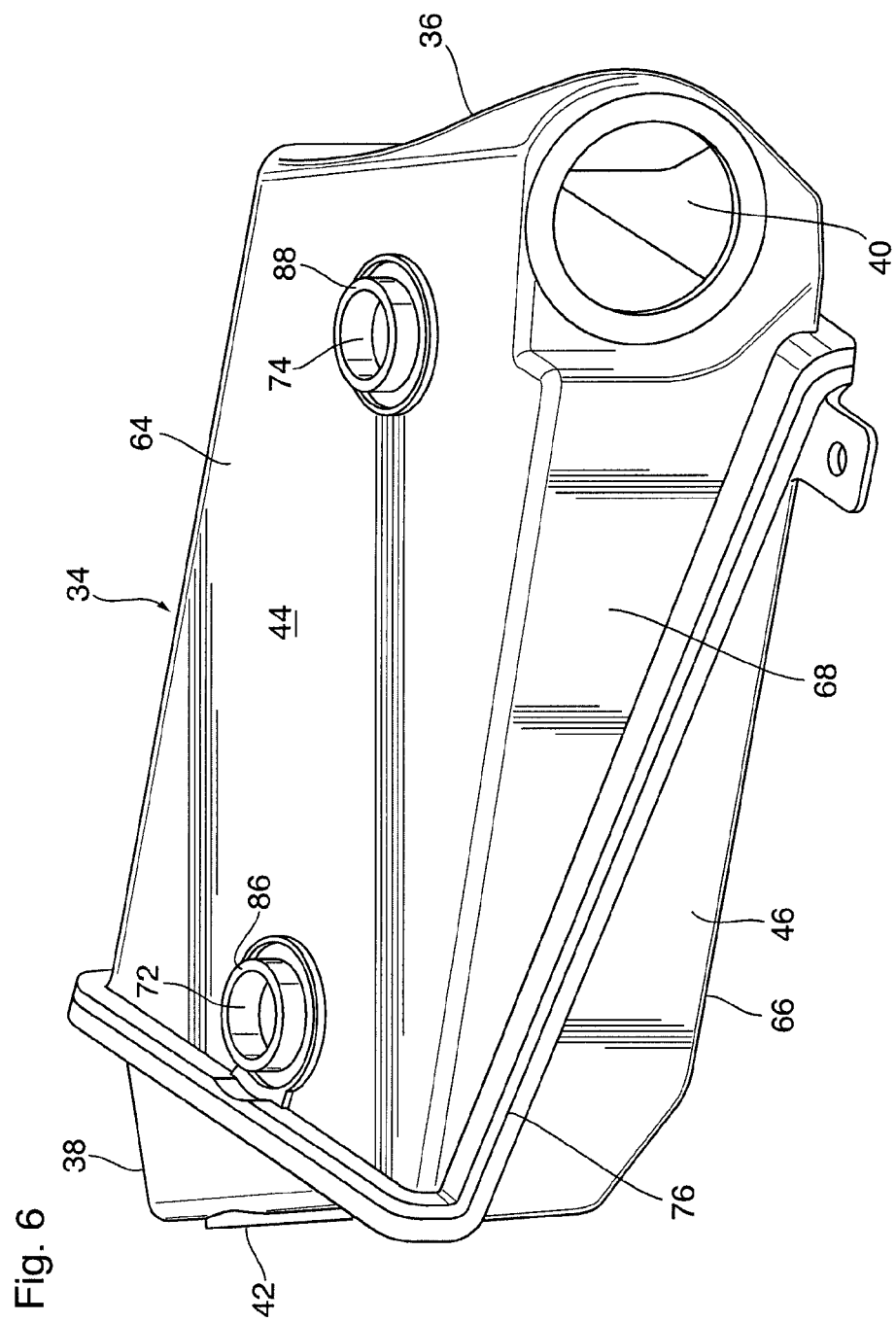
FIG. 6 is an isolated top perspective view of the housing of the heat exchanger of FIG. 1.

As best seen in FIGS. 2 and 3, there are side gaps 90, 92 between each side cover 68 or 70 of housing 34 and the corresponding side 18 or 20 of the core 12. The presence of gaps 90, 92 is due partly to spacing between the tubes 48 and the side covers 68, 70 of housing 34, and partly due to spacing between the edges of the turbulence-enhancing inserts 62 and the side covers 68, 70 of housing 34. If left open, these gaps 90, 92 will permit excessive bypass flow of the hot charge air, reducing the efficiency of the heat exchanger 10. Therefore, the side covers 68, 70 of core 34 are provided with bypass blocking elements 94, 96, each of which at least partially blocks one of the gaps 90 or 92.

In the core construction shown in the drawings, the edges of the tubes 48 are comprised of the peripheral flanges of the core plates from which the tubes 48 are formed. The turbulence-enhancing inserts 62 are provided only between the raised portions of the core plates which define the coolant flow passages 50, and therefore do not extend to the edges of the peripheral flanges of tubes 48. For this reason, the sides 18, 20 of core 12 have a comb-like appearance. As a result, the bypass blocking elements 94, 96 have a complementary comb-like profile with fingers 98, as shown in FIG.

9. These fingers 98 extend into the spaces between tubes 48, as shown in FIG. 3, thereby blocking some or all of the gaps 90, 92.

In order to provide effective blocking of bypass flow, the blocking elements 94, 96 may extend from the top 14 to the bottom 16 of core 12, and may be integrally formed with the housing 34. Since the comb-like structure of the blocking elements 94, 96 may interfere with formation of the subassembly of core 12 and inlet segment 44 of housing 34, both of the bypass blocking elements 94, 96 are attached to the outlet segment 46 of housing 34. To complete the assembly of heat exchanger 10, the outlet segment 46 can then be slid over the inlet end 22 of core 12, in the direction of arrow A, such that the fingers 98 of the blocking elements 94, 96 slide between the tubes 48.

Since the bypass blocking elements 94, 96 are both provided in the outlet segment 46, and extend throughout substantially the entire height of core 12, they are provided proximate to the outlet end portion 38 of the heat exchanger 10. It will be appreciated that the configuration of the bypass blocking elements 94, 96 depends partly on the construction of core 12, and that the configuration and location of blocking elements 94, 96 may be different from that described herein, depending on the structure of the core 12.

Although the first embodiment shows a specific configuration of sealed joint 76 which lies in a diagonal plane, it will be appreciated that other constructions are possible. For example, the inlet and outlet segments 44, 46 of housing 34 maybe separated along a vertical plane cutting through the side covers 68, 70 of the housing 34. In such an embodiment, a portion of the sealed joint will lie in a plane which extends through both of the side covers 68, 70 of the housing 34, wherein this plane is substantially perpendicular to the top cover 64 and/or the bottom cover 68 of housing 34.

It will also be appreciated that the direction of flow of the charge air through heat exchanger 10 may be reversed from that shown in the drawings.

A heat exchanger 110 according to a second embodiment is now described below with reference to FIGS. 10 to 12. Heat exchanger 110 includes a number of elements which are the same as or similar to elements of heat exchanger 10 described above. Accordingly, like reference numerals are used to identify like elements of heat exchanger 110 and, unless otherwise indicated in the following discussion, the above description of these elements applies equally to the corresponding elements of heat exchanger 110.

Figure 12:
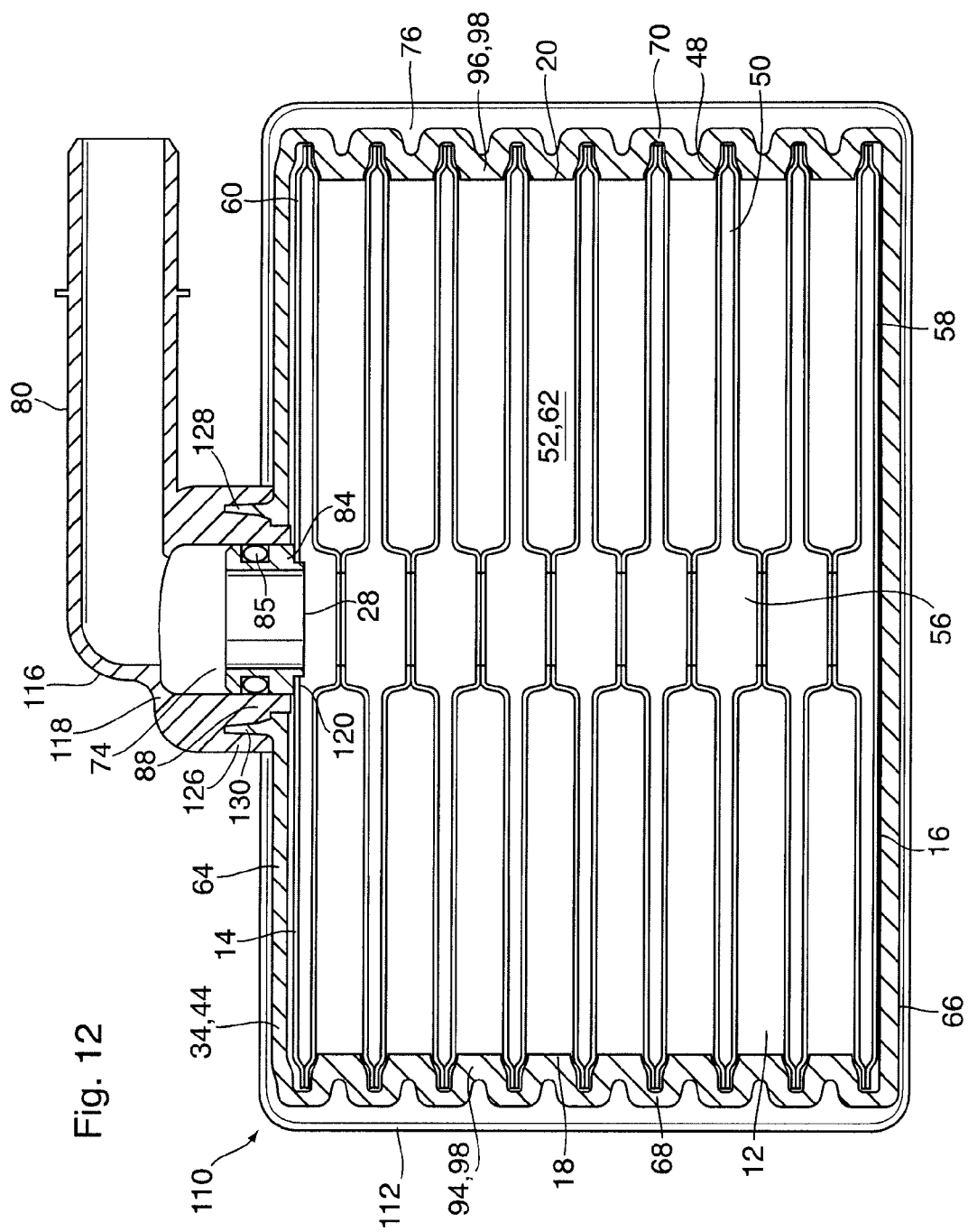
FIG. 12 is a cross-sectional view along line 12-12' of FIG. 11.

Heat exchanger 110 comprises a core 12 which is illustrated in the cross-section of FIG. 12. The core 12 may be the same as or similar to core 12 described above, and therefore the components of core 12 of heat exchanger 110 are not further described herein.

Heat exchanger 110 further comprises a housing 34 surrounding the core 12, the housing 34 comprising an inlet segment 44 which includes an inlet end portion 36 of core 34, and an outlet segment 46 which includes an outlet end portion 38 of the housing 34. The material comprising the inlet segment 44 may have a greater heat resistance than the material comprising the outlet segment 46, and the segments 44, 46 may be comprised of plastic materials.

The housing 34 is continuous and substantially completely surrounds the core 12. In addition to the inlet end portion 36 and the outlet end portion 38, the housing 34 also comprises a top cover 64 which is provided over the top 14 of core 12, a bottom cover 66 which is provided over the bottom 16 of core 12, and a pair of side covers 68, 70 which are provided over the sides 18, 20 of core 12.

The inlet and outlet segments 44, 46 of core 12 are directly joined to one another along a sealed joint 76. In the second embodiment, the sealed joint 76 may be located in a substantially vertical plane extending from the bottom cover 66 to the top cover 64, dividing each of the top cover 64, bottom cover 66 and side covers 68, 70 into two portions. The joint 76 of heat exchanger 110 is formed by a pair of nesting, axially-extending flanges, a first flange 112 extending axially from the end of inlet segment 44 located at joint 76, and a second flange 114 extending axially from the end of outlet segment 46 located at joint 76. The flanges 112, 114 are shaped and sized such that the second flange 114 of the outlet segment 46 fits inside and nests with the first flange 112 of the inlet segment 44. The outer surface of second flange 114 is then sealed to inner surface of the first flange 112 to form the sealed joint 76. It can be seen from the drawings that the flanges 112, 114 have a substantially rectangular shape, and are continuous except along a portion of the top cover 64, as will be described below.

With the housing 34 constructed from segments 44, 46 as described above, the housing 34 is effectively divided into two cup-shaped segments having open ends. This construction is advantageous from a manufacturing standpoint, since it permits the pre-assembled core 12 to first be attached to one of the segments 44 or 46, and then permits the other segment 44 or 46 of housing 34 to be added to the assembly and secured to the other segment 44 or 46 along the sealed joint 76. The advantages of this construction will be further discussed below. Although the sealed joint 76 of heat exchanger 110 is shown as being located in a substantially vertical plane, it will be appreciated that this is not essential. It is possible to provide the joint in a non-vertical plane, such as a diagonal plane similar to the joint 76 of heat exchanger 10.

The coolant inlet and outlet openings 26, 28 of core 12 are both provided in the top 14 of core 12, and more specifically in the top plate 60, so as to provide communication with the coolant inlet and outlet manifolds 54, 56. Core 12 further comprises coolant inlet and outlet fittings 82, 84 which are formed of aluminum and brazed to the remainder of core 12.

In contrast to heat exchanger 10, the coolant inlet and outlet openings 72, 74 and corresponding inlet and outlet fittings 78, 80 of heat exchanger 110 are provided in a fitting portion 116 of the housing 34. In particular, the fitting portion 116 comprises a cover portion 118 having a first end at which the coolant inlet opening 72 is provided and at which the inlet fitting 78 is mounted on an upper surface of cover portion 118, and a second end at which the coolant outlet opening 74 is provided and at which the outlet fitting 80 is mounted on an upper surface of the cover portion 118. The cover portion 118 is shaped and sized to cover an elongate slotted opening 120 in the top cover 64 of housing 34, wherein the slotted opening 120 extends across the area of joint 76 and includes a first portion 122 in the inlet segment 44 and a second portion 124 in the outlet segment 46. Each portion 122, 124 of slotted opening 120 is open at the open end of the cup-shaped inlet or outlet segment 44 or 46, so as to permit the segments 44, 46 to be slid over the core 12 with its protruding coolant inlet and outlet fittings 82, 84.

The coolant inlet opening 72 and the coolant outlet opening 74 are spaced apart in the cover portion 118 so as to be in flow communication with the coolant inlet and outlet openings 26, 28 of the core 12. Also, the cover portion 118 has a lower surface from which cylindrical collars 86, 88 extend downwardly. As in the first embodiment, the collars 86, 88 form seals with the inlet and outlet fittings 82, 84 of core 12. For example, the fittings 82, 84 may be sealed inside respective collars 86, 88 by O-rings 85, each received in an annular groove in the outer surface of one of the fittings 82, 84.

Figure 10:
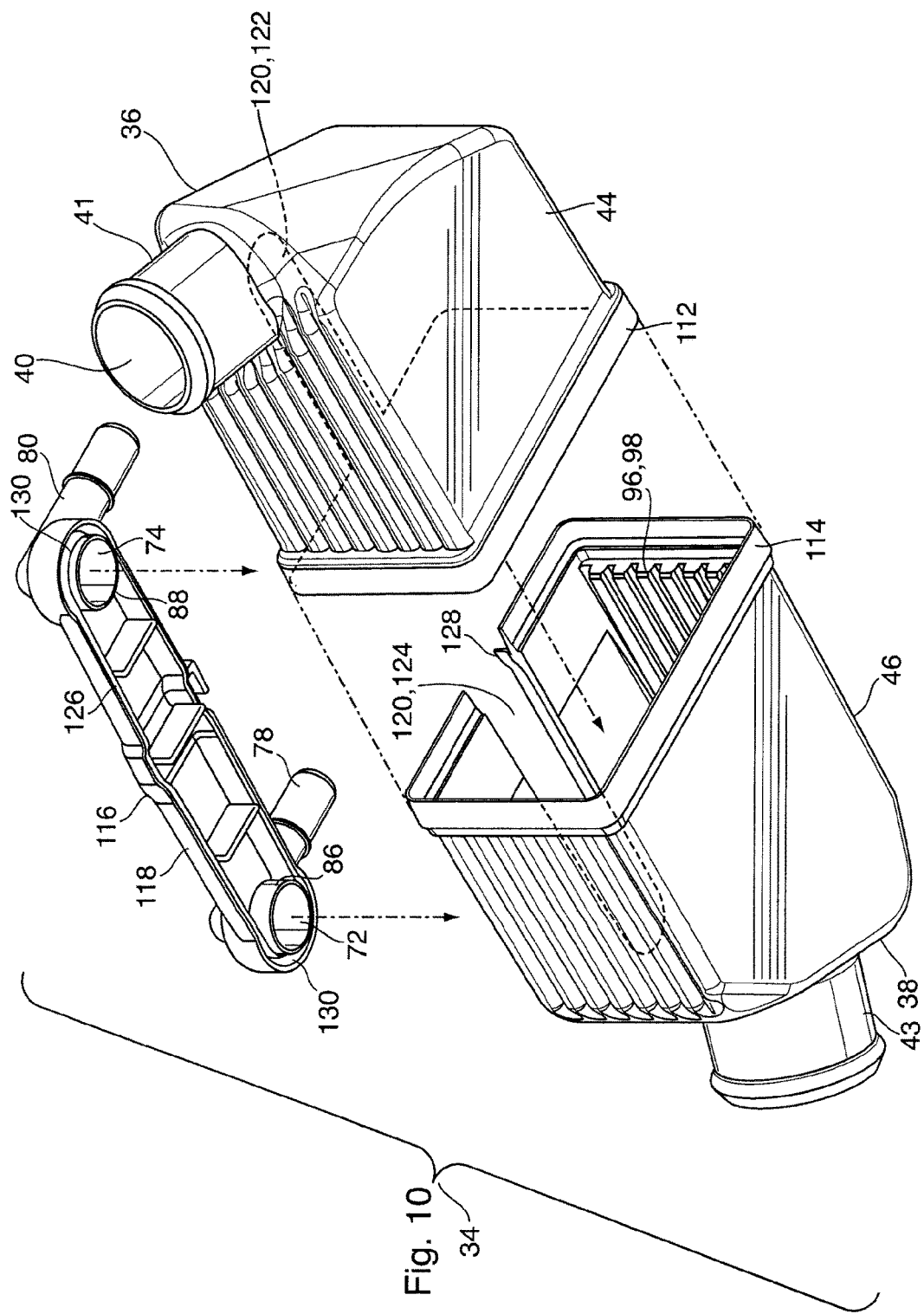
FIG. 10 is an exploded, perspective view of the housing of a heat exchanger according to a second embodiment.
Figure 11:
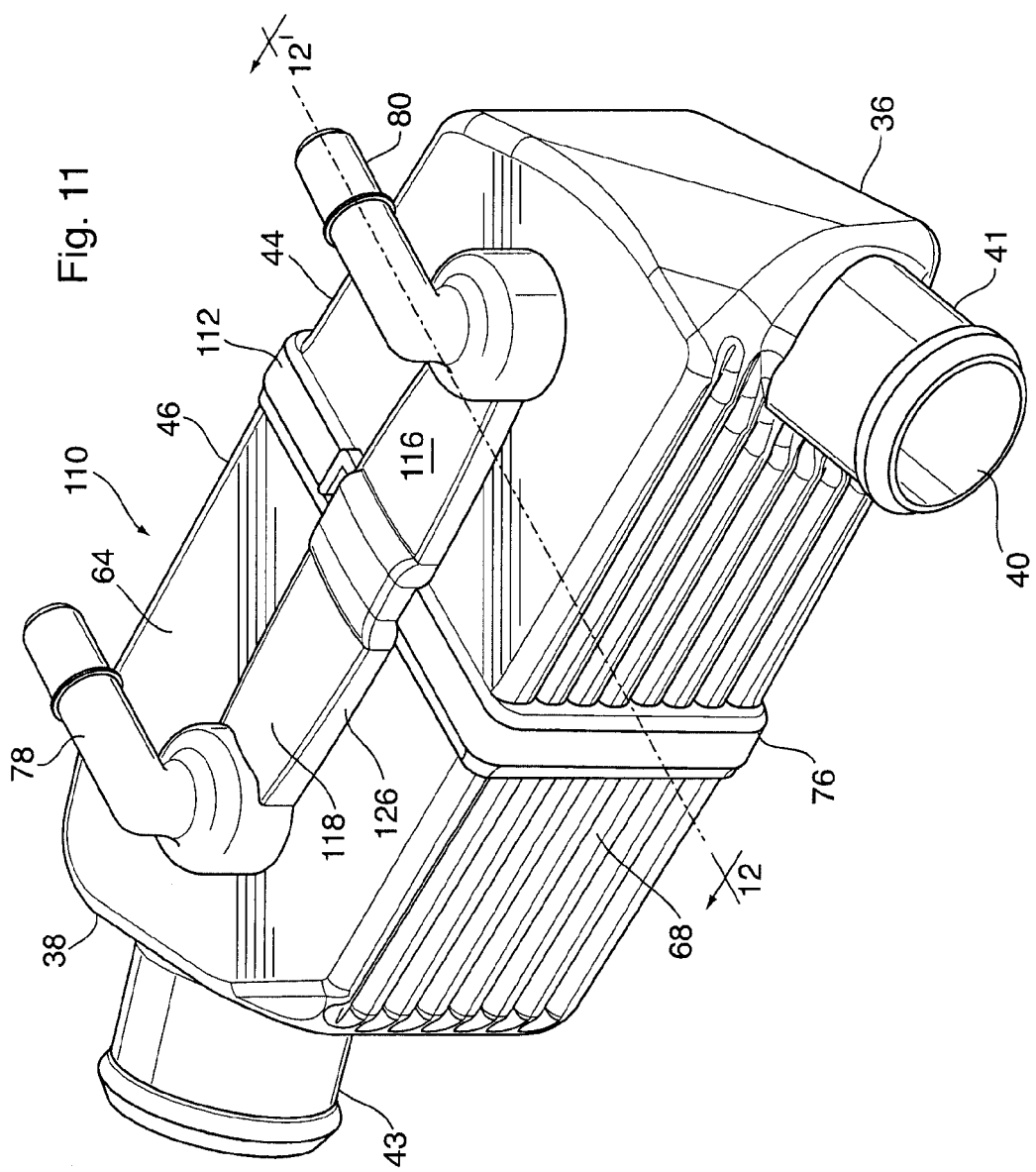
FIG. 11 is a perspective view of the heat exchanger according to the second embodiment.

As shown in FIGS. 10 and 12, the coolant fittings 78, 80 each have a cylindrical base portion which may be integrally formed with a downwardly extending peripheral flange 126 of the cover portion 118. The downwardly extending peripheral flange 126 of cover portion 118 is adapted to fit over, and nest with an upstanding peripheral flange 128 surrounding the slotted opening 120 in the top cover 64 of housing 34. At the ends of fitting portion 116, the downwardly extending peripheral flange 126 of cover portion 118 is spaced from the collars 86, 88 so as to form a gap 128 into which the upstanding flange 128 is received. The upstanding flange 128 of housing 34 and the downwardly extending flange 126 of cover portion 118 are sealed together along their entire peripheries to thereby seal the fitting portion 116 to the inlet and outlet segments 44, 46 of housing 34.

During manufacturing, the core 12 is first received inside the inlet and outlet segments 44, 46 of housing 34, with the axial flanges 112, 114 nesting as described above. The slotted opening 120 is then covered by fitting portion 116, which is pushed down to nest the flanges 126, 128 and so that the coolant fittings 82, 84 of the core 12 are received inside the collars 86, 88 of the fitting portion 116. It can be seen that this arrangement allows the core 12 with protruding fittings 82, 84 to be slidingly received inside both segments 44, 46 of core 34.

The housing 34 is provided with bypass blocking elements 94, 96 along the inner surfaces of side covers 68, 70 so as to at least partially block any gaps between the side covers 68, 70 and the irregular, comb-shaped sides 18, 20 of core 12. The bypass blocking elements 94, 96 have a complementary comb-like profile with fingers 98, as shown in FIGS. 10 and 12. These fingers 98 extend into the spaces between tubes 48, as shown in FIG. 12, thereby substantially completely blocking any gaps between the sides 18, 20 of core 12 and the side covers 68, 70 of housing 34.

The blocking elements 94, 96 extend from the top 14 to the bottom 16 of core 12, and are provided in all the spaces between adjacent tubes 48 of core 12. Furthermore, the blocking elements 94, 96 are integrally formed with the housing 34. In this regard, the fingers 98 of blocking elements 94, 96 extend inwardly toward core 12 along at least a portion of the axial length of the core 12. In the illustrated embodiment, the blocking elements 94, 96 extend along substantially the entire length of core 12, and therefore extend along substantially the entire lengths of the side covers 68, 70, being provided in both the inlet and outlet segments 44, 46 of core 34. However, it will be appreciated that effective bypass blocking may be provided where the blocking elements 94, 96 extend along only a portion of the length of core 12, and only along portions of the lengths of side covers 68, 70, and/or they may be provided in only one of the inlet or outlet segment 44 or 46 of core 34.

Furthermore, to minimize thickness of the side covers 68, 70, the profiles of the blocking elements 94, 96 may extend through the thickness of the side covers 68, 70, thus giving the outer surfaces of side covers 68, 70 with a ribbed appearance. It will be appreciated that this is not necessary, and that the outer surfaces of side covers 68, 70 may have smooth surfaces. During assembly of heat exchanger 110, the inlet and outlet segments 44, 46 of core 34 are both slid over the core 12 in the axial direction, as mentioned above.

Although the invention has been described in connection with certain embodiments, it is not limited thereto. Rather, the invention includes all embodiments which may fall within the scope of the following claims.

What is claimed is:

1. A gas/liquid heat exchanger comprising:
   (a) a core having a top, a bottom, a pair of sides, an inlet end, an outlet end, coolant inlet and outlet openings, and gas inlet and outlet openings,
   wherein the gas inlet and outlet openings are provided at the respective inlet and outlet ends of the core; and
   wherein the sides of the core include indentations;
   (b) a housing at least partially surrounding the core, wherein the housing comprises an inlet end portion over the inlet end of the core, and an outlet end portion over the outlet end of the core;
   wherein the inlet end portion of the housing includes a gas inlet opening in communication with the gas inlet opening of the core, and the outlet end portion of the housing includes a gas outlet opening in communication with the gas outlet opening of the core;
   wherein the housing comprises an inlet segment which includes the inlet end portion of the housing and an outlet segment which includes the outlet end portion of the housing, wherein the inlet and outlet segments are separately formed;
   wherein the housing surrounds the core, wherein the housing comprises a top cover over the top of the core, a bottom cover over the bottom of the core, and a pair of side covers over the sides of the core;
   wherein the inlet and outlet segments are each joined to a remainder of the housing along a sealed joint;
   wherein at least one of the side covers of the housing is spaced from one of the sides of the core by a gap, and wherein the heat exchanger further comprises at least one bypass blocking element, wherein each of said blocking elements at least partially blocks one of the gaps and is integrally formed with the housing;
   wherein each of said bypass blocking elements extends along one of the sides of the core, and extends from the top to the bottom of the core, so as to substantially completely block one of said gaps; and
   wherein the bypass blocking elements each comprise a comb structure having fingers extending into the indentations of the sides of the core.

2. The heat exchanger according to claim 1, wherein the housing includes a coolant inlet opening communicating with the coolant inlet opening of the core, and a coolant outlet opening communicating with the coolant outlet opening of the core.

3. The heat exchanger according to claim 1, wherein the inlet segment of the housing is directly joined to the outlet segment along said sealed joint.

4. The heat exchanger according to claim 1, wherein a portion of the sealed joint lies in a plane which extends through both of the side covers of the housing.

5. The heat exchanger according to claim 1, wherein portions of the sealed joint extend across the top cover and the bottom cover of the housing.

6. The heat exchanger according to claim 1, wherein a portion of the sealed joint lies in a plane which extends through both of the side covers of the housing and wherein said plane is substantially perpendicular to the top cover and/or the bottom cover of the housing; and
   wherein a portion of the sealed joint extends across the top cover of the housing between the coolant inlet and outlet openings of the housing, such that one of the coolant inlet and outlet openings is provided in the inlet segment of the housing, and the other of the coolant inlet and outlet openings is provided in the outlet segment of the housing.

7. The heat exchanger according to claim 1, wherein a portion of the sealed joint lies in a plane which extends through both of the side covers of the housing and wherein said plane is inclined relative to the top cover and/or the bottom cover of the housing.

8. The heat exchanger according to claim 7, wherein a portion of the sealed joint extends across the top cover of the housing proximate to the outlet end portion of the housing, and wherein the coolant inlet and outlet openings of the housing are both provided in the inlet segment of the housing;
wherein the inlet and outlet segments of the housing are each comprised of a plastic material, and wherein the core is comprised of aluminum; and
wherein the plastic material comprising the inlet segment has a heat resistance which is greater than a heat resistance of the plastic material comprising the outlet segment.

9. The heat exchanger according to claim 8, wherein the inlet and outlet segments of the housing are each comprised of a plastic material,
wherein the coolant inlet opening of the housing is provided with a plastic inlet fitting and the coolant outlet opening of the housing is provided with a plastic outlet fitting,
wherein the coolant inlet opening of the core is provided with an aluminum inlet fitting and the coolant outlet opening of the core is provided with an aluminum outlet fitting, and
wherein the coolant inlet fitting of the core is sealingly received in the coolant inlet opening of the housing and the coolant outlet fitting of the core is sealingly received in the coolant outlet opening of the housing;
wherein the core comprises a stack of flat tubes, each of the tubes having a hollow interior defining a coolant flow passage, wherein the tubes are spaced apart to define gas flow passages between the tubes;
wherein the top of the core is defined by a top plate of the core, and wherein the inlet and outlet openings of the core are both provided in the top plate; and
wherein turbulence-enhancing inserts are provided in the gas flow passages.

10. The heat exchanger according to claim 1, wherein both of the bypass blocking elements are attached to only one of the segments of the housing.

11. The heat exchanger according to claim 10, wherein both of the bypass blocking elements are attached to the outlet segment of the housing.

12. The heat exchanger according to claim 1, wherein the bypass blocking elements are provided in both the inlet and outlet segments of the housing; and
wherein the bypass blocking elements extend along substantially an entire length of the core from the inlet end to the outlet end.

13. The heat exchanger according to claim 1, wherein the sealed joint is located in a substantially vertical plane extending from the bottom cover to the top cover, dividing each of the top cover, the bottom cover and the side covers into two portions.

14. The heat exchanger according to claim 13, wherein the sealed joint is formed by a pair of nesting, axial flanges, a first one of the flanges extending axially from an end of inlet segment, and a second flange extending axially from an end of the outlet segment; and
wherein the axial flanges are shaped and sized such that the one of the flanges fits inside and nests with the other of the flanges.

15. The heat exchanger according to claim 13, wherein the inlet and outlet segments of the housing are both cup-shaped with open ends, and wherein the sealed joint is located in a plane which is between the coolant inlet and outlet openings, such that the coolant inlet and outlet openings are located on opposite sides of the sealed joint.

16. The heat exchanger according to claim 15, wherein the sealed joint is provided in a substantially vertical plane.

17. The heat exchanger according to claim 15, wherein the coolant inlet and outlet openings and the coolant inlet and outlet fittings are provided in a fitting portion of the housing, wherein the fitting portion is separately formed from the inlet segment and the outlet segment;
wherein the fitting portion comprises a cover portion having a first end at which the coolant inlet opening is provided and at which the inlet fitting is mounted on an upper surface thereof, and a second end at which the coolant outlet opening is provided and at which the outlet fitting is mounted on an upper surface thereof; and
wherein the core is slidably received in both the inlet and outlet segments of the housing.

18. The heat exchanger according to claim 17, wherein the top cover of the housing has an elongate slotted opening, and wherein the cover portion of the fitting portion shaped and sized to cover the slotted opening; and
wherein the slotted opening extends across the sealed joint and includes a first portion in the inlet segment and a second portion in the outlet segment, wherein the first and second portions of the slotted opening are open at the open ends of the inlet and outlet segments.

19. The heat exchanger according to claim 18, wherein the cover portion has a downwardly extending peripheral flange and the housing has an upstanding peripheral flange substantially surrounding the slotted opening in the top cover of the housing; and
wherein the downwardly extending peripheral flange of the cover portion is adapted to fit over and nest with the upstanding peripheral flange of the housing.

20. The heat exchanger according to claim 17, wherein the coolant inlet opening of the core is provided with an aluminum inlet fitting and the coolant outlet opening of the core is provided with an aluminum outlet fitting, and wherein the coolant inlet fitting of the core is received in the coolant inlet opening of the fitting portion of the housing and the coolant outlet fitting of the core is received in the coolant outlet opening of the fitting portion of the housing; and
wherein the cover portion of the fitting portion has a lower surface from which cylindrical collars extend downwardly, wherein the cylindrical collars are adapted to fit over and seal with the inlet and outlet fittings of the core.

* * * * *